(No Model.)
M. B. HOOD.
CORD ADJUSTER FOR ELECTRIC LIGHTS, &c.
No. 536,031. Patented Mar. 19, 1895.
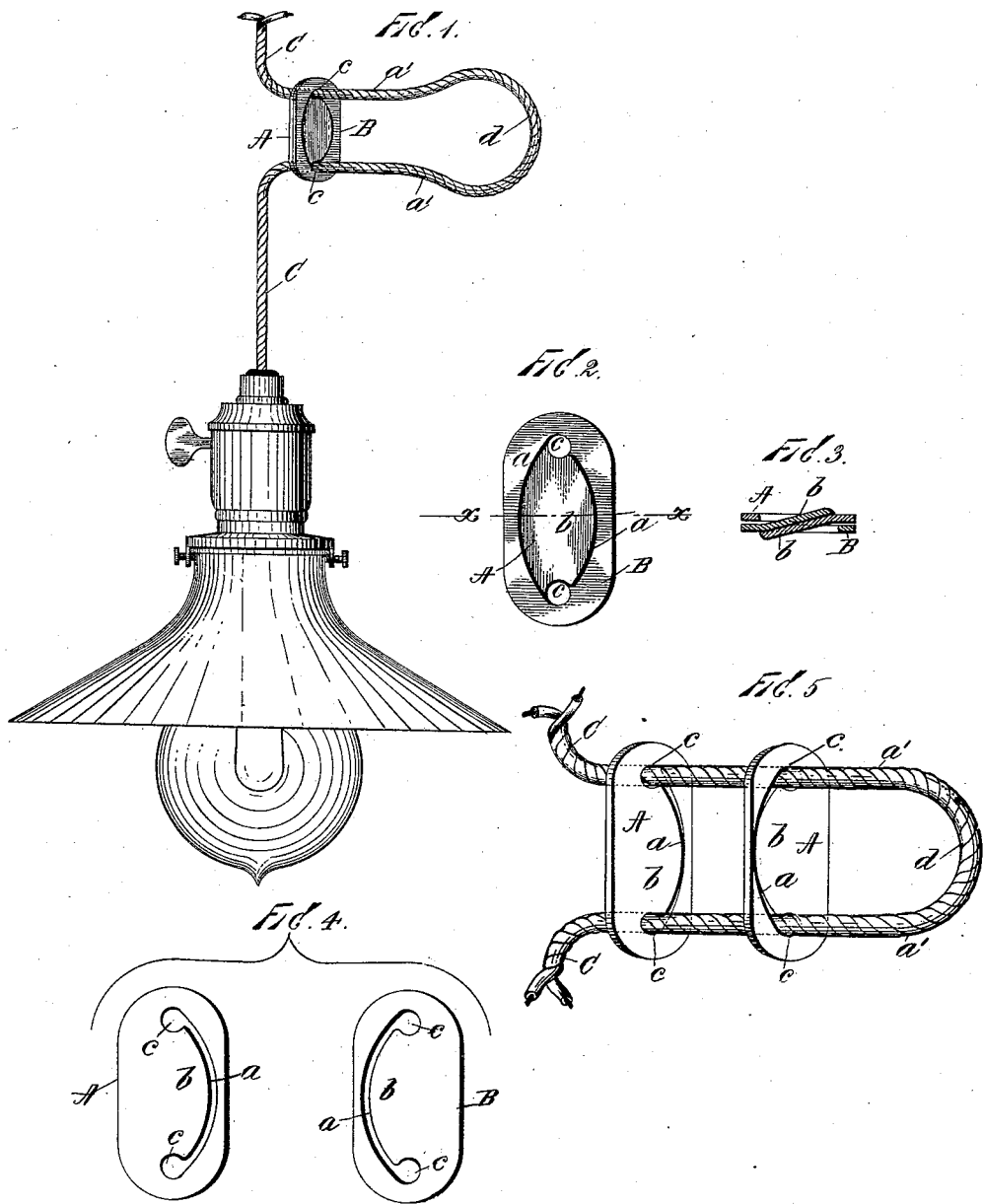

United States Patent Office.

MILTON B. HOOD, OF MONTCLAIR, NEW JERSEY.

CORD-ADJUSTER FOR ELECTRIC LIGHTS, &c.

SPECIFICATION forming part of Letters Patent No. 536,031, dated March 19, 1895.

Application filed May 26, 1894. Serial No. 512,506. (No model.)

*To all whom it may concern:*

Be it known that I, MILTON B. HOOD, of Montclair, in the county of Essex and State of New Jersey, have invented a new and useful Improvement in Cord-Adjusters for Electric Lights, &c.; and I do hereby declare that the following is a full, clear, and exact description of the same, reference being had to the accompanying drawings, making a part of this specification, in which—

Figure 1 is a perspective view of a cord adjuster made according to my invention and showing the same as applied to use upon the cord of an incandescent electric light. Fig. 2 is a detached side view of my said cord adjuster. Fig. 3 is a transverse sectional view of the same taken in the line, $x$, $x$, of Fig. 2. Fig. 4 comprises side views of the two parts, separated, which by their combination constitute my said cord adjuster, and Fig. 5 is a perspective view similar to Fig. 1 but illustrating the operation of applying my said adjuster to the looped cord of an incandescent electric light.

In the use of incandescent electric lights it is a common practice to place the bulb with its inclosed incandescent part or filament at the extremity of a flexible non-conducting cord within which latter are provided the conducting wires of the light and which is suspended from a ceiling, wall, or other suitable support and of course duly connected with a suitable source of electric energy. As this construction and arrangement of electric lights, their cords, conductors, &c., are well known, further or specific description of them here is unnecessary.

In practice it is desirable that the available length of the cord should be capable of adjustment to meet the varying exigencies of use and to provide for this various devices, technically termed cord adjusters, of more or less utility have been devised.

My invention comprises a novel combination of parts whereby I provide a cord adjuster which is capable of being applied to an electric light cord without detaching the latter from its place, and without detaching the bulb or lighting devices from the cord, which firmly and securely holds the looped portion of the cord in position, and which may be manufactured at a cost much less than that of the devices for like purposes heretofore in use.

A, and B, are two plates of non-conducting sheet material which are counterparts of each other and which are placed in opposing positions and interlocked as herein presently explained. Each of these plates has formed in it a curved slit or slot, $a$, which provides to it a lip, $b$. At each end of the slit or slot, $a$, is a space, $c$, sufficient to permit the cord, B, of an incandescent electric light to be passed through it. These plates are preferably made of the sheet material commonly known in the art as "fiber" but any sheet material which permits the structure hereinbefore described and which is a non-conductor of electricity may be employed.

In the use and application of the invention the cord, C, is looped in the usual manner as at, $d$, the size of the said loop, $d$, being of course proportioned to the extent to which the working length of the cord is to be shortened as compared with its total length. The loop is then passed bodily through the slit or slot, $a$, of one or the other, A, or B, as the case may be, of the plates, with the lip, $b$, thereof extended in one direction, and this plate is brought to the desired point or place upon the loop with the two parts, $a'$, $a'$, of the latter placed in the spaces, $c$, at the ends of the slit or slot, $a$. This done the loop is in the same manner passed through the slit or slot of the other plate but with its lip, $b$, extended in a direction the opposite of that of the first plate. The two plates being brought into juxtaposition with their lips thus opposed, the lip of the one plate is slipped through the slit or slot and consequently past the lip of the other, thus bringing the parts of the two plates into the relative positions shown more fully in Fig. 3, the cord being gripped at each end of the plate between the opposing end portions of the slits or slots of the two plates as shown in Fig. 1. The contiguous surfaces of the lips, $a$, being pressed against each other with a more or less frictional contact and the normal position of the cord aside from the portion comprised in loop, $d$, being more or less coincident with the length of the plates when placed upon the cord in the position described, while the loop itself is at more or less of an angle thereto, it follows that there is a bend in the cord when the latter is gripped at each end of the device, this assisting the gripping action at the ends of the slits or slots of the two plates as described. By bringing the cord opposite the loop into lines substantially transverse to the length of the plates the device may, ordinarily, be moved along the cord to any desired location thereon without separating the plates, the tension or grip of the device upon the cord being increased when the cord resumes its normal position to provide the bend in the cord at the ends of the slit or slot as described.

As shown in the drawings the ends, $c$, of the slits or slots, $a$, are intended to be, when necessary, enlarged to duly receive a cord of a diameter greater than the width of the said slits or slots, the degree of such enlargement being of course proportionate to the diameter of the cord, C.

It is of course to be understood that while my invention is of especial utility for adjusting the cords of incandescent lights, it may also be used for similarly adjusting cords designed for other purposes.

What I claim as my invention is—

The cord adjuster composed of two plates of non-conducting sheet material each constructed with a slit or slot, $a$, providing a lip, $b$, arranged to interlock with the corresponding parts of the other to grip a looped cord at the opposite ends of said slits or slots, substantially as herein set forth.

MILTON B. HOOD.

Witnesses:
SYDNEY TAYLOR,
LEON LEWIN.